United States Patent Office 3,574,687
Patented Apr. 13, 1971

3,574,687
ION EXCHANGE RECOVERY OF OXAZOLE FROM NITRILE COMPOSITIONS AND REGENERATION OF THE RESIN
Claude Darcas and Claude Tcherkawsky, Saint-Avold, France, assignors to Ugine Kuhlmann
No Drawing. Original application May 23, 1967, Ser. No. 640,492. Divided and this application Aug. 8, 1969, Ser. No. 870,758
Int. Cl. C07d 85/44, 85/22; C07c 121/32
U.S. Cl. 260—307                   4 Claims

ABSTRACT OF THE DISCLOSURE

This disclosure describes a procedure for the removal of oxazole and like compounds from the partially purified reaction product of the vapor phase catalytic reaction between an ethylenic hydrocarbon such as propylene with ammonia and air. The removal is effected by contacting the nitrile composition with a cationic ion exchange resin in the acid form. The disclosure also describes the regeneration of cationic ion exchange resins partially or totally saturated with weakly basic materials by contact with deionized water.

---

This is a division of application Ser. No. 640,492, filed May 23, 1967.

This invention relates to the recovery of nitrogen containing heterocyclic compounds such as oxazole from nitrile compositions which have been purified by standard methods after production by catalytic reaction of ethylenic hydrocarbons with ammonia and oxygen in the vapor phase.

Nitriles, including acrylonitriles may be produced by the vapor phase reaction of ethylenically unsaturated hydrocarbons such as propylene with ammonia and an oxygen containing gas such as air in the presence of known catalysts. The product as produced contains a variety of impurities and even after purification, for example by distillation, small quantities of these impurities may remain. The persence of these impurities have a deleterious effect on the quality of the products subsequently prepared from the nitriles. For example, certain of these impurities adversely effect the quality of polymers prepared from acrylonitrile. It is these nitrile compositions referred to herein as "partially purified nitrile compositions" with which this invention is principally concerned.

Various methods have been devised for the separation of these impurities by distillation, but the volatility of the impurities is often so close to that of the nitrile to be purified that separation by distillation is very complicated and costly. These problems are especially significant in the case of acrylonitrile which is an extremely important industrial chemical.

Heterocyclic compounds, especially those which are weakly basic due to the presence in the ring of at least one nitrogen atom, as in the azole group of oxazole or isoxazole, are amongst the harmful impurities which have been found in industrial reaction products of the above described class. These compounds, especially oxazole, are themselves industrially important as starting materials or intermediates in the production of various commercial products, especially pharmaceutically useful compounds.

A method of separating and recovering oxazole and related heterocyclic compounds of low basicity while avoiding the complications and cost of prior distillation procedures would be a significant advance in the art. Such a method has now been discovered.

In accordance with this invention nitriles such as acrylonitrile containing oxazole and similar nitrogeneous bases are purified by contacting the nitrile composition with a cationic ion exchange resin in the acidic form. The selected resin should be substantially insoluble in the nitrile to be purified. The process of the invention is applicable to the purification of nitrile compositions containing from 0.5 part per million to 5% by weight of heterocyclic compounds or even a higher percentage of those compounds.

The preferred cationic ion exchange resins for use in this invention are sulfonated polystyrene resins crosslinked with varying amounts of divinyl benzene. Severel commercial embodiments are available. The generally differ amongst themselves in particle size, porosity, extent of cross-linking, etc. Suitable resins which may be employed are commercially available under the trademarks, Duolite C 20, Allasion CS, Dowex 50, Amberlyst 15, Amberlite 200, Amberlyst XN 1005, Lewatite S–100, Lewatite S–115, Relite CFS, and the like.

The invention is preferably practiced in a continuous manner by passing the composition to be purified through a resin bed at a flow rate of from about 4 to about 60 volumes of composition per volume of resin per hour. A preferred rate consistent with achieving the desired purity with commercial quantities of composition at reasonable cost is from 10 to 30 volumes per volume of resin per hour. When operating within these defined ranges substantially all of the hererocyclic, nitrogenous base is removed to produce a commercial nitrile of especially high purity. At rates appreciably below 4, the process is very slow without a compensating improvement in results. The degree of purity of the nitrile product varies inversely with the rate of throughput as this rate increases above 60, although useful results can be achieved at rates appreciably above this value.

The invention, as stated above, includes as one of its aspects the recovery of the nitrogenous base which is absorbed on the resin, and the regeneration of the resin to permit its reuse. The regeneration of the absorptive capacity of the resin is an especially valuable object of this invention.

Various procedures have been proposed for regenerating cationic ion exchange resins which have exchanged their hydrogen ions for basic materials. Resins which have exchanged hydrogen ions for sodium or calcium ions are regenerated by contact with an acid of sufficiently high concentration. In general, acids which are of greater acidity than the resin will displace a base from the resin. The original basic compound can also be eluted by bathing the resin with a solution of a stronger base which displaces the weaker base. Subsequently the resin is regenerated through washing with an acidic compound capable of producing a salt by reacting with the stronger base on the resin.

A disadvantage of these various regeneration procedures is the large consumption of the elution reagents and the large quantities of water which are utilized to wash the resin so as to remove even traces of acid or base which might remain in the resin and contaminate the product to be purified. With cationic resins it is even necessary in washing the resins to utilize distilled water or water from which both cations and anions have been removed so as to avoid premature and unnecessary removal of hydrogen ions, especially by alkaline or alkaline earth ions. The cost of regeneration has markedly limited the use of cationic ion exchange resins to the extent that they are not utilized in many operations where they could otherwise be advantageously employed.

It has been discovered in accordance with this invention that it is possible to regenerate cationic resins which have been saturated or at least partially so with weakly basic substances, by a facile and economic procedure which does not employ alkaline or acidic reagents and permits the recovery of the absorbed basic substances from the resins. The process comprises elution of absorbed substances such as oxazole and the like by washing with deionized water. This is a most surprising and valuable discovery since it had previously been believed that the regeneration of the resins required the use of a substance capable of providing ions.

The washing can be effected with relatively cold water, but an elevated temperature, preferably the temperature of boiling water is more effective, and requires a smaller quantity of water. In a particularly preferred aspect of the invention the hot water wash is combined with entrainment of the desorbed substance by steam followed by condensation to permit recovery of the substance. Accordingly, the regeneration can be effected at temperatures of from about 20° C. to about 100° C.

The process of the invention allows substantially complete regeneration of the initial fixation capacity of the resin so as to permit removal of the basic substance from successive nitrile compositions, and reuse of the same mass of resin for a practically unlimited number of absorption-desorption cycles.

In summary, the regeneration technique of this invention does not employ acidic and/or basic reagents which complicate the installation and increase the costs. In addition it combines the advantages of a substantially quantitative and yet easy recovery of materials which are considered undesirable impurities in the original nitrile compositions, but which are, nonetheless, valuable for the synthesis of other valuable compounds by known methods.

The following non-limiting examples are given by way of illustration only and illustrate the process of this invention as utilized to purify a partially purified acrylonitrile monomer produced by the vapor phase catalytic reaction of propylene, ammonia and air. The acrylonitrile contains 85 parts per million by weight of oxazole and 0.3% by weight of water. The oxazole content of the acrylonitrile is determined by gas phase chromatography utilizing apparatus equipped with a very sensitive flame ionization detector which responds to an oxazole content on the order of 0.5 part per million.

EXAMPLE 1

A glass tube with an inside diameter of 10 mm., and a height of 500 mm. is used to contain the cationic resin column. A plug of glass wool is placed at the base of the column to prevent the resin from washing through. A three way stop-cock at the head of the column allows the column to be shut off or the shifting of the material feeding the column from the nitrile to deionize water. A similar three-way stop-cock at the bottom of the column permits directing of the effluent into the receiver flasks or permits the entry of water or steam into the resin column to loosen it, if necessary, or to regenerate it.

The composition to be purified is fed to the column with a metering pump. In this example the flow is downward through the column, but it could be an upward flow.

Amberlyst 15, a sulfonated cationic ion exchange resin of the class specifically described above is employed. The particle size is from about 0.3 to 1 mm. The resin is utilized in the acid form. A total of 7.5 g. of dry resin are weighed out and allowed to swell in distilled water. In the swollen state the resin occupies a volume of approximately 25 cc. The tube is filled with water and the moist, swollen resin is slowly dropped in while vibrating the tube to avoid formation of cavities in the resin column. The column is then drained.

The partially purified acrylonitrile to be further purified is metered into the column at a rate of approximately 500 cc. per hour. At this rate the resin bed is operated continuously in a flooded condition.

One liter fractions of eluate are analyzed chromatographically as described above. It is found that up to the sixth liter, the effluent contains no trace of oxazole so that 6 liters of acrylonitrile have been purified to the point where very sensitive instruments are not capable of detecting the presence of oxazole. The seventh liter contains approximately 10 p.p.m. of oxazole. The break-through point of the oxazole under these conditions, therefore, is between the sixth and seventh liter of acrylonitrile.

The operation is continued until the oxazole concentration in the effluent is approximately equal to that in the influent, i.e. 85 p.p.m. This requires the collection of approximately eleven liters of acrylonitrile. At this point the resin is saturated with oxazole. The operation is then discontinued and the column is drained.

This example illustrates the purification of acrylonitrile to the point of complete saturation of the resin. In industrial practice, conditions would be adjusted so that the column would be taken out of operation just before the breakthrough point so that only acrylonitrile containing no detectable oxazole would be produced. Under these conditions the resin would be only partially saturated and regeneration using the procedures of the following examples would progress more quickly.

EXAMPLE 2

After loosening the saturated resin column produced in the previous example by the upward passage of an air stream, the resin is washed with water at room temperature. The washing rate is about 300 cc./hr.

With a column in which the resin is saturated with oxazole the direction of the wash flow may be either the same as, or opposite to that of the acrylonitrile flow. If the resin is only partially saturated, best results are obtained by washing in the direction opposite to the flow of acrylonitrile. In this particular experiment the direction of flow of the acrylonitrile and of the deionized water is the same.

It is found by chromatographic analysis of the eluate that 80% of the oxazole originally on the column is eluted with one liter of water and 93% with three liters of water.

After collection of three liters of eluate, regeneration is discontinued and the column is ready for a new purification operation.

EXAMPLE 3

A resin saturated with oxazole by the procedure of Example 1 is regenerated with deionized water, using the procedure of Example 2, except that the temperature of the water is held at 40° C. to 50° C. Analysis of the eluate by gas chromatography indicates that 98% of the oxazole is removed from the resin with only one liter of water at this temperture.

EXAMPLE 4

The procedure of Example 3 is repeated using water at a temperature of from 90° C. to 100° C. It is found that only 550 cc. of deionized water is required to remove 98% of the oxazole. After the passage of only one liter of water no more oxazole is detectable in the eluate.

EXAMPLE 5

A total of 7.5 g. of Amberlyst 15 is saturated with oxazole in accordance with the procedure of Example 1. The resin is first loosened by passing cold deionized water upwards through the column. The three way stop-cock is replaced by an extender which forms an expansion vessel of 30 mm. diameter and 70 mm. height. The upper portion of the expansion vessel is closed with a stopper to which a condenser is affixed.

After loosening the resin, the apparaaus is flooded with sufficient water to fill the expansion vessel to 50% of its capacity. Live steam is then injected at the base of the column to cause the resin to rise up into the expansion vessel, and to increase the temperature of the water in the system to the boiling point. The vapors are condensed and collected in 50 cc. fractions. After condensation of anly 100 cc., 98% of the oxazole is removed from the resin. After condensation of 250 cc., no more oxazole is detectable in the condensate.

The oxazole is recovered from the combined condensate fractions by distillation in an efficient plate column.

EXAMPLE 6

Procedures similar to those of Examples 1 and 2 are carried out through 50 successive cycles of absorption, elution and regeneration, each cycle comprising the passage of acrylonitrile containing 85 p.p.m. of oxazole through 7.5 g. of Amberlyst 15 with practically complete elimination of oxazole and regeneration of the resin.

Chromatographic analysis of the eluates from successive cycles shows no elimination of the absorption capacity of the resin. Its breakthrough point remains between 6 and 7 liters of acrylonitrile for each cycle.

No deterioration of the Amberlyst 15 particles is apparent by microscopic examination. No increase in the number of fine particles is detectable by granulometric analysis.

What is claimed is:

1. A process which comprises the removal of a compound selected from the group consisting of oxazole and isoxazole from acrylonitrile compositions produced by vapor phase reaction between propylene, ammonia and oxygen in the presence of a catalyst and containing at least one of said compounds by contacting said composition with a water-moist cationic ion exchange resin in the acid form, the same being the only ion exchange resin used in the process, whereby at least one of said compounds is absorbed on said resin, thereafter recovering acrylonitrile from said composition, and regenerating the resin by contact with deionized water.

2. A process as in claim 1 in which the temperature of the deionized water is from about 20° C. to about 100° C.

3. A process as in claim 1 in which the material desorbed by regeneration is entrained with steam.

4. A process as in claim 3 in which the vapors from the regeneration mixture are condensed and redistilled to recover the oxazole or isoxazole.

References Cited

UNITED STATES PATENTS

| 2,444,589 | 7/1948 | Blann | 260—465.9 |
| 3,146,258 | 8/1964 | Leach | 260—465.9 |

FOREIGN PATENTS

| 1,131,134 | 10/1968 | Great Britain. |

MELVIN GOLDSTEIN, Primary Examiner

U.S. Cl. X.R.

260—2.2, 465.3, 465.9